United States Patent [19]

Charng

[11] Patent Number: 5,666,687
[45] Date of Patent: Sep. 16, 1997

[54] WIPER BLADE INCLUDING YOKE MOUNTED LATERAL WIND-DEFLECTING SURFACE

[76] Inventor: Cedric S.K. Charng, 3F-1, Lane 56, Wan-An St., Moozar, Taipei, Taiwan

[21] Appl. No.: 502,293

[22] Filed: Jul. 13, 1995

[51] Int. Cl.⁶ .................. B60S 1/38; B60S 1/28
[52] U.S. Cl. .................. 15/250.201; 15/250.44; 15/250.46; 15/250.41
[58] Field of Search .......... 15/250.201, 250.44, 15/250.361, 250.451, 250.452, 250.453, 250.46, 250.48, 250.41; D12/219, 220

[56] References Cited

U.S. PATENT DOCUMENTS

| | | | |
|---|---|---|---|
| D. 330,691 | 11/1992 | Leu | 15/250.44 |
| 2,937,393 | 5/1960 | Brueder | 15/250.201 |
| 3,390,417 | 7/1968 | Kohler et al. | 15/250.44 |
| 3,673,631 | 7/1972 | Yamadai et al. | 15/250.01 |
| 4,852,206 | 8/1989 | Fisher | 15/250.44 |
| 5,179,761 | 1/1993 | Buechele et al. | 15/250.201 |

FOREIGN PATENT DOCUMENTS

| | | | |
|---|---|---|---|
| 29295 | 4/1979 | Australia | 15/250.201 |
| 1572869 | 6/1990 | U.S.S.R. | 15/250.201 |

Primary Examiner—Gary K. Graham
Attorney, Agent, or Firm—Longacre & White

[57] ABSTRACT

The invention seeks to provide an improved wiper blade assembly, and in a broad aspect provides a windscreen wiper blade assembly comprising at least a primary yoke and a pair of secondary yokes articulated thereto, the primary yoke and/or the secondary yokes being provided with at least one wind-deflecting surface, oriented in relation to the direction of motion of the vehicle so that when said vehicle is moving to create air flow over the windscreen, air is deflected by said surface or surfaces to produce a force tending to urge the wiper blade assembly towards the windscreen of the vehicle.

4 Claims, 4 Drawing Sheets

WIPER BLADE INCLUDING YOKE MOUNTED LATERAL WIND-DEFLECTING SURFACE

FIELD OF THE INVENTION

The present invention relates to wiper blade assemblies, typically of the type used for mounting windscreen wipers on motor vehicles.

BACKGROUND OF THE INVENTION

A conventional single blade wiper assembly comprises a primary yoke for attachment to a wiper arm, two secondary yokes pivotally attached to opposite ends of the primary yoke, and a separate tertiary yoke pivotally attached to one, usually the outermost one, of the two free ends of each secondary yoke. Claws for mounting a wiper blade are provided at the ends of the tertiary yokes, and at the ends of the secondary yokes not occupied by the tertiary blades. There is thus provided a flexible six point mounting for the wiper blade, which affords a reasonable degree of contact between the wiper blade and the windscreen, at least in calm conditions when the vehicle is stationary or travelling at comparatively slow speed.

Dual wiper blade assemblies are also know for mounting a pair of wiper blades. Typically a known dual wiper blade assembly comprises a primary yoke, one or two secondary yokes pivotally attached to each end of the primary yoke and a separate tertiary yoke articulated to one of the two ends of each secondary yoke. The free ends of each of the secondary and tertiary yokes are provided with claws for mounting a pair of generally parallel wiper blades.

A problem arises with known wiper blade assemblies, however, when the vehicle is travelling forwards, creating an upward and transverse air flow over the windscreen. The wiper blade assembly naturally tends to lift away from the windscreen on its downward stroke as air flow intervenes between the windscreen and the wiper. When the vehicle is travelling at speed, the problem is exacerbated.

SUMMARY OF THE INVENTION

The invention seeks to provide an improved wiper blade assembly, and in a broad aspect provides a windscreen wiper blade assembly comprising at least a primary yoke and a pair of secondary yokes articulated thereto, the primary yoke and/or the secondary yokes being provided with at least one wind-deflecting surface, oriented in relation to the direction of motion of the vehicle so that when said vehicle is moving to create air flow over the windscreen, air is deflected by said surface or surfaces to produce a force tending to urge the wiper blade assembly towards the windscreen of the vehicle.

As mentioned above, the principal problem with wind-lift of the wiper blade from the windscreen occurs primarily on the downward stroke of the wiper. Therefore each deflector surface may therefore consist of or include a surface element which slopes downwardly towards (i.e. is not perpendicular to) the windscreen of the vehicle, when the wiper blade assembly is mounted thereon in a generally horizontal position. This may be accomplished by either a curved or a flat surface, as will be explained more fully below.

In some preferred embodiments, deflection surfaces are provided by curved portions of the outer profile of the assembly. For example, a hollowed out or indented portion may be provided on the outer surface of the assembly (i.e. the surface facing in the direction of motion of the vehicle). Preferably the conformation of the hollowed out portion is effective to deflect air from a path generally perpendicular to the outer surface of the assembly (which will be the predominant direction of incidence of air flowing over the windscreen during forward movement of the vehicle) to a direction generally parallel to said outer surface. By such means, a major part (and preferably substantially the whole) of the momentum of the air flow incident upon the deflection surface is transferred to the wiper blade assembly, thus maximizing the biasing force on the assembly towards the windscreen.

BRIEF DESCRIPTION OF THE DRAWINGS

The invention is hereinafter described by way of example only, with reference to the accompanying drawings in which.

DETAILED DESCRIPTION OF THE PREFERRED EMBODIMENT

Figure 1:
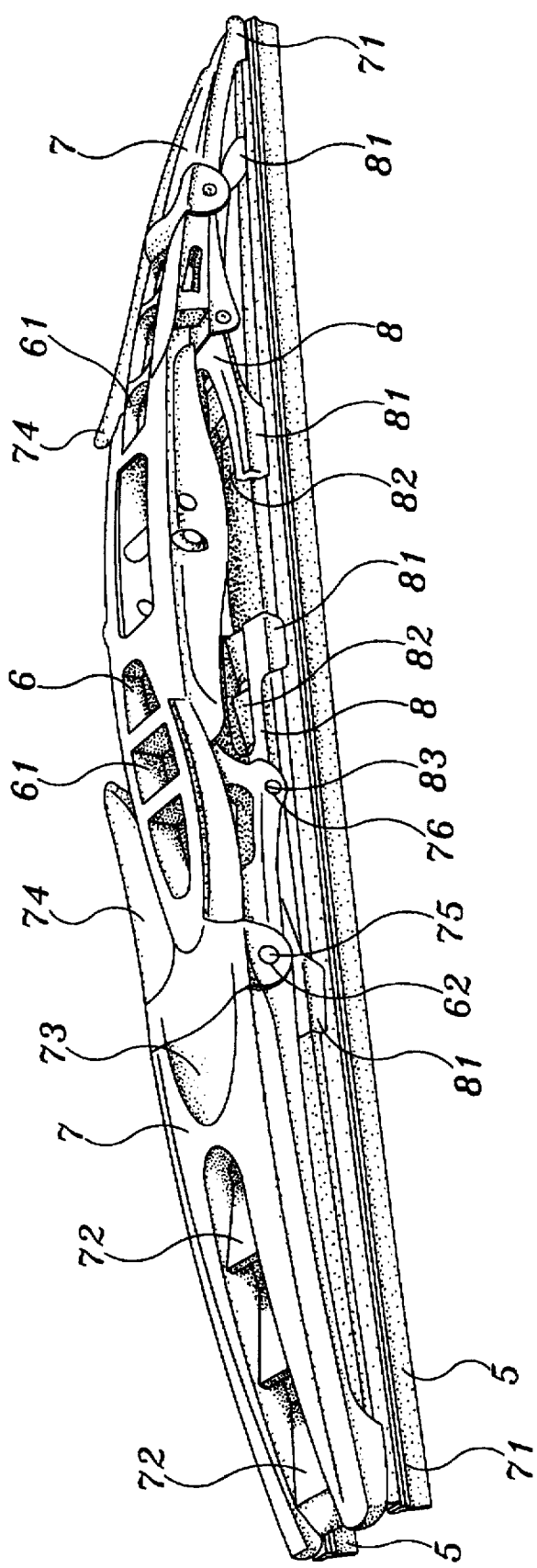
FIG. 1, is a perspective view of an embodiment of wiper blade assembly according to the invention.

In a specific embodiment described in detail below, the hollowed out portion intersects the outer surface of the assembly at a generally arcuate or parabolic rim, and is formed by walls which descend relatively steeply from the central portion of the rim, and become progressively shallower away from the central portion, and towards the end portions of the rim. In the described embodiment, there are two hollowed out portions, one disposed on each secondary yoke at the vicinity at which the secondary yoke is articulated to the primary yoke, and oriented inwardly towards a central portion of the primary yoke so that incident air is deflected generally in that direction. The hollowed out portions could alternatively, or additionally, be positioned on the primary yoke, preferably in the vicinity of the secondary yoke mounting. An advantage of such positioning is that even pressure is applied to the limbs of the secondary yokes. To assist further in evenly distributing the biasing force and improving the conformability of the wiper blade with the windscreen, tertiary yokes are articulated to the inner limbs of the secondary yokes, rather than the outer limbs.

Alternatively or additionally, deflecting surface(s) may be provided by one or more elongate members or wings extending generally parallel to the main axis of the wiper blade assembly. Preferably, four such wings are provided in total, arranged in two pairs, one pair being associated with each limb of the primary yoke. Each such pair comprises individual wings disposed substantially parallel to each other on opposite lateral sides of the limb. Conveniently, the wings are mounted on the secondary yokes, and arranged to lie alongside the primary yoke when the secondary yokes are mounted thereto. The deflection surfaces of the wings may be planar or curved, but in either event are preferably oriented inwardly towards the central axis of the primary yoke.

In another alternative arrangement, a deflection surface is provided by a side wall of a slot passing through the primary yoke, the slot providing a through passage for air, oriented generally in the direction of travel of the vehicle. A deflection surface is provided by the slot wall positioned on the upper side of the slot, when the wiper assembly is mounted to the vehicle in a generally horizontal parked position. Such a side wall in inclined with respect to an axis perpendicular to the outer surface of the primary yoke, so as to slope downwardly in a direction towards the windscreen of the vehicle. The lower wall of the slot may extend generally parallel to an axis perpendicular to the outer surface of the primary yoke, or may be inclined thereto in a direction opposite to the inclination of the upper wall. It is preferred that there by some degree of inclination of the lower wall, but that this should usually be less than the degree of inclination of the upper wall. The slot is therefore tapered from the outer surface of the primary yoke towards the inner surface. A plurality of similar slots may be provided, preferably in the primary yoke, but optionally also (or alternatively) in the secondary yokes. When the slots are provided in conjunction with wings, the wings may be disposed so as to channel air into the slots.

The above described features can be used individually or in combination. In each case one or more surfaces are provided which slope downwardly towards the windscreen of the vehicle. By this means, air flowing over a windscreen impinges on the deflection surface and produces a reaction force directed generally upwardly towards the windscreen. During the downward stroke of the wiper, the downward force provided by the driving motor counteracts the upward component of the reaction force, and the wiper assembly is forced downwards while being biased towards the windscreen to discourage or prevent wind lift.

It will be noted in the arrangements described above which have inwardly directed hollowed out portions, symmetrical arrangements of wings, or slots having inclined bottom walls, that in addition to the described deflection surfaces which slope downwardly towards the windscreen, surfaces are also provided which slope upwardly towards the windscreen. Such surfaces help to bias the wiper assembly towards the windscreen during the upward stroke of the wiper, and are also of use in wipers which describe a full semi-circular path, half of which involves a downstroke with the assembly effectively inverted.

FIG. 1 shows an embodiment of wiper blade assembly of the double blade type, but the principles of the invention are also applicable to assemblies carrying a single blade. The FIG. 1 apparatus comprises a primary yoke 6, to which are attached two secondary yokes 7 by pivotal attachment means 62/75. Tertiary yokes 8 are pivotally mounted on the inner arm of yokes 7 by pivotal attachment means 76/83. Each yoke element includes co-extensive longitudinal elements 9 connected one to the other by transverse web elements 10. Wiper blades 5 comprising wiper rubbers received in backing strips are held by claws 71 and 81 provided respectively on the secondary and tertiary yokes.

Figure 2:
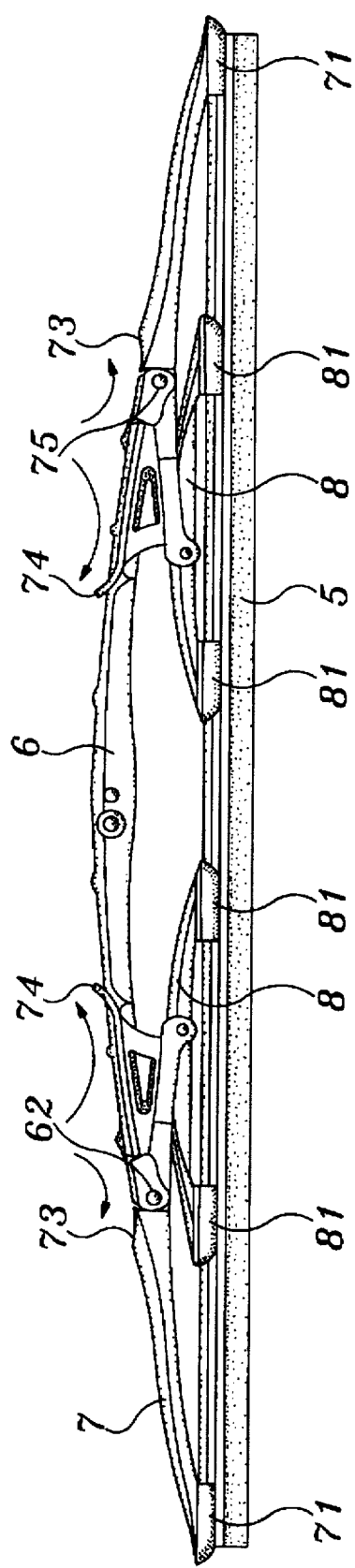
FIG. 2, is a side elevation of the FIG. 1 embodiment.
Figure 3:
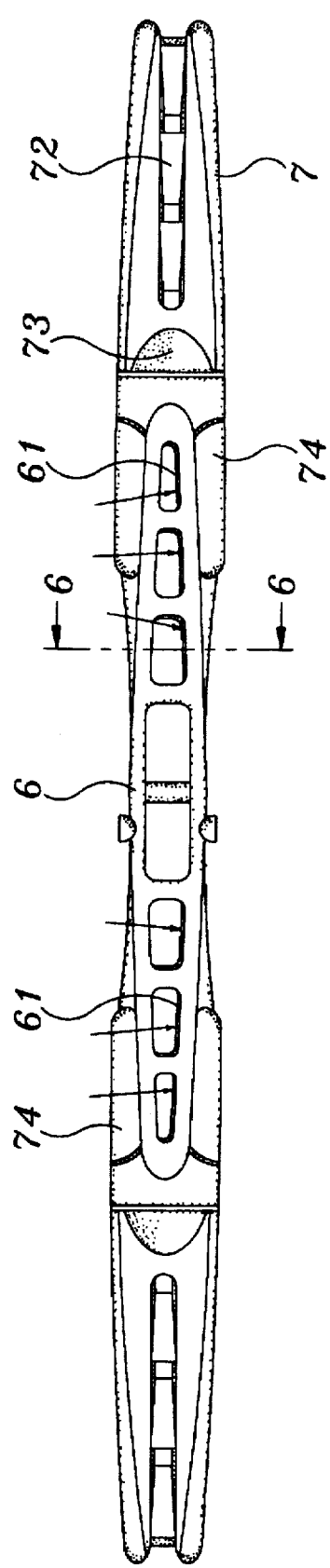
FIG. 3, is a top plan of the FIG. 1 embodiment.
Figure 4:
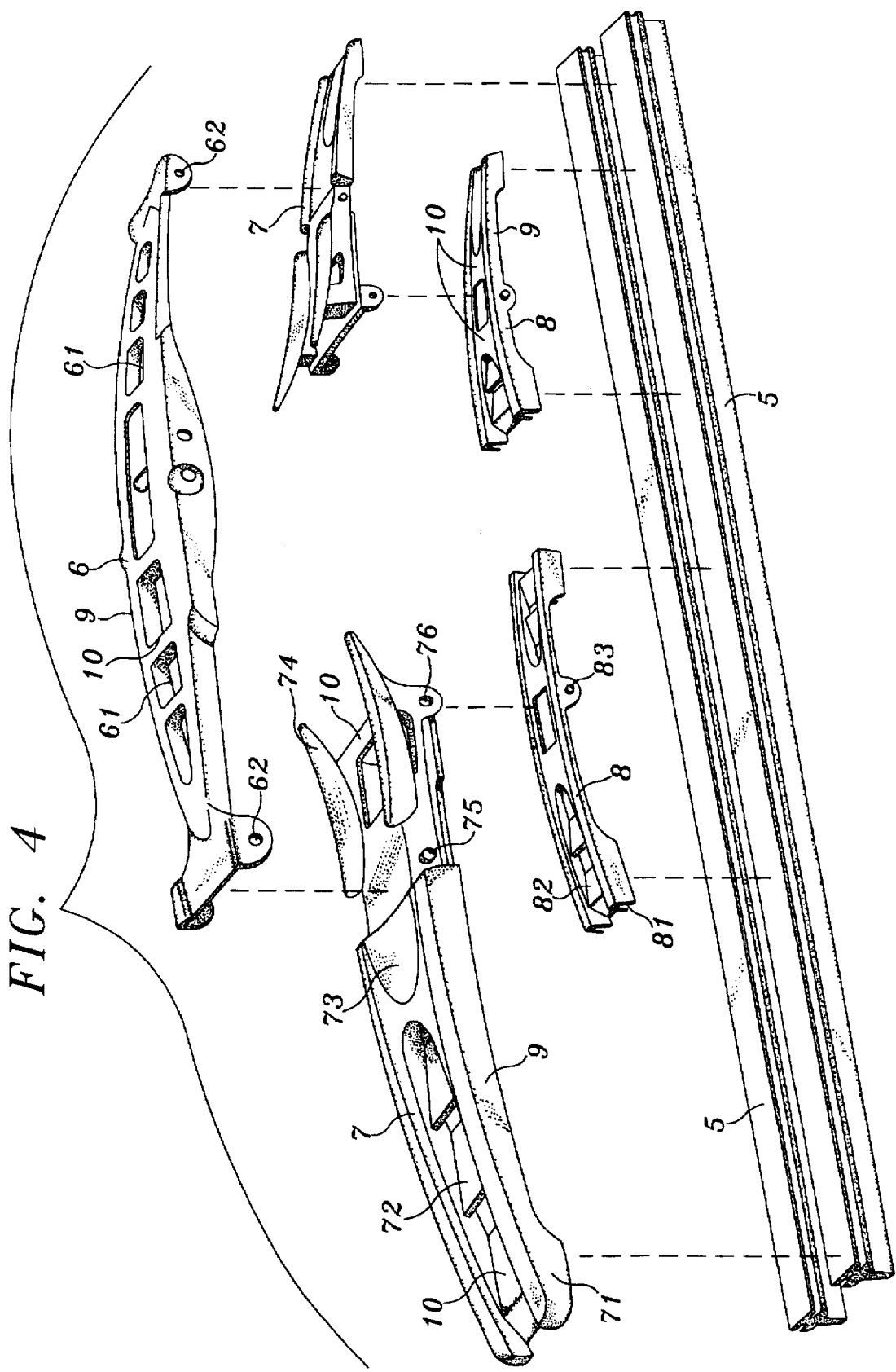
FIG. 4, is an exploded view of the components of the FIG. 1 embodiment.
Figure 5:
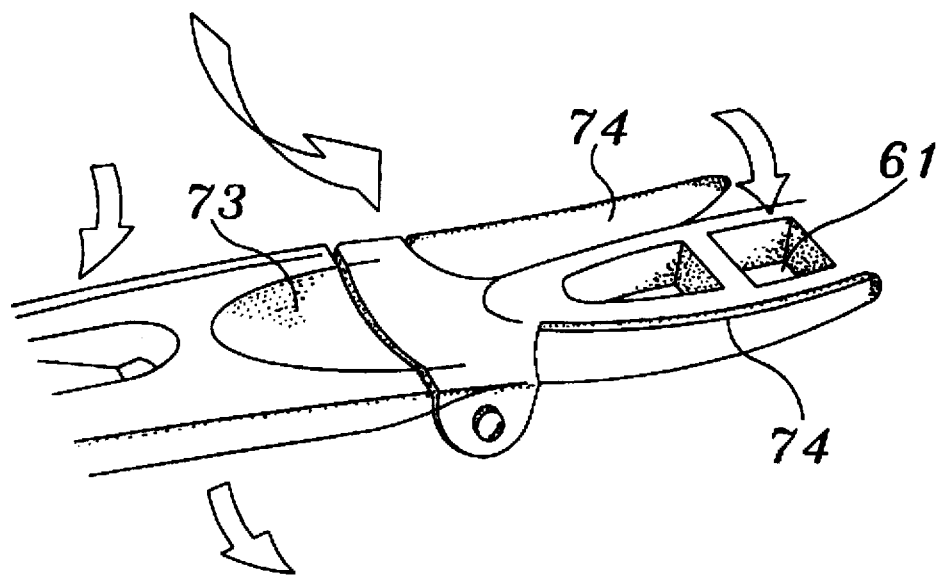
FIG. 5, is an enlarged perspective view of a portion of the FIG. 1 embodiment, in the vicinity of a mounting of a secondary yoke to the primary yoke.

As will be seen more clearly from FIG. 5, the secondary yokes 7 are provided with hollowed out or indented portions 73 defined by the elements 9 and webs 10, which serve to deflect impinging air in the direction shown by the arrows in FIG. 5 and FIG. 2, when the wiper blade assembly is placed in a head wind, for example created by the forward movement of the vehicle. When the wiper blade assembly is in motion in a downward stroke, the upper wall of the hollowed out portion 73 constitutes a deflection surface for impinging air, which produces a reaction force in the wiper blade assembly, tending to bias it towards the windscreen.

The secondary yokes 7 are also provided with elongate wings 74 which extend towards the central portion of the primary yoke 6 from a position in the general vicinity of the point of mounting of secondary yokes 7 to primary yoke 6. Wings 74 provide deflection surfaces which slope inwardly in a direction towards the windscreen of the vehicle. The wings illustrated have curved surfaces, but the surfaces could equally well be flat. When the wiper blade assembly is in motion in a downward stroke, the upper wings present faces which slope generally downwardly towards the windscreen, and which when impinged upon by oncoming air tend to produce a force biasing the wiper blade assembly towards the windscreen.

Figure 6:
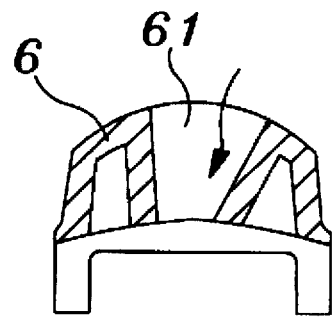
FIG. 6, is a sectional view along line 6—6 of FIG. 3.

Primary yoke 6 is also provided with slots 61 defined by elements 9 and webs 10, which provide through passages for air to the secondary yoke hollowed out portions. The inner profile of a typical slot 61 is shown in FIG. 6, from which it will be seen that the right hand wall as illustrated (which constitutes the uppermost wall of the slot when the wiper blade assembly is mounted on a vehicle in a parked condition) is inclined to an axis perpendicular to the outer surface of the wiper blade assembly, so that it presents a face which slopes downwardly towards the windscreen. The left hand wall of the slot (which constitutes the lowermost wall when the wiper blade assembly is parked) is also inclined to the aforesaid axis, in the opposite direction to the right hand wall, and to a lesser extent. When the wiper blade assembly is in motion in a downward stroke, air from a headwind enters slots 61 and impinges upon the uppermost walls thereof, producing a reaction force tending to bias the wiper blade assembly towards the windscreen.

The effect of the invention is enhanced in the illustrated embodiment by the provision of fins 72, which also serve to create the biasing force towards the windscreen when the vehicle is in motion.

I claim:

1. A superstructure for a wiper element, comprising:

a primary yoke structure including a first pair of co-extensive longitudinal elements which are connected one to the other by first transverse web elements, each end of said primary yoke structure including connection means to connect said primary yoke structure in pivotal relation to a pair of secondary yoke structures, said first co-extensive elements and first transverse web elements defining therebetween first hollowed out portions for directing airflow through said primary yoke structure, each of said secondary yoke structures each including a pair of second co-extensive longitudinal elements which are connected one to the other by second transverse web elements, each of said pair of secondary yoke structure being connected to said ends of said primary yoke structure at a mid-portion of each of said secondary yoke structure, at an end of each said secondary yoke structure positioned nearest the central portion of said primary yoke structure, said second co-extensive elements and second connecting web elements of each of said secondary yoke structures defining second hollowed out portions for directing airflow through said secondary yoke structure and aligning with said first hollowed out portions in overlying portions of said primary yoke structure, wing means for directing air flow mounted to each of said secondary yoke structures at a position proximate said connection between said primary and secondary yoke structures, said wing means being laterally disposed to and extending alongside said primary yoke structure and the aligned hollowed out portions, said wing means being shaped so as to direct air flow inwardly towards said first and second hollowed out portions.

2. A superstructure as recited in claim 1, further comprising:

a tertiary yoke element mounted to said end of each of said pair of secondary yoke structures located nearest a central portion of said primary yoke structure.

3. A superstructure as recited in claim 1, wherein:

said first hollowed out portions define a slot having a depth, said slot having first and second opposed walls positioned in the longitudinal direction of said primary yoke structure, said first wall being inclined with respect to a line perpendicular to a top surface of said primary yoke structure, said second wall being generally parallel to said line.

4. A superstructure as recited in claim 3, wherein:

said slot is a tapering slot which becomes narrower through the depth of said primary yoke structure.

* * * * *